US006558632B1

(12) United States Patent
Güller et al.

(10) Patent No.: US 6,558,632 B1
(45) Date of Patent: May 6, 2003

(54) DEVICE FOR HOLDING REACTION VESSELS WHICH CAN BE THERMALLY ADJUSTED AND AGITATED

(75) Inventors: Rolf Güller, Herznach (CH); Séraphin Munch, Rixheim (FR); Philippe Jablonski, St. Louis (FR); Hansjörg Tschirky, Ettingen (CH)

(73) Assignee: Chemspeed Ltd., Augst (CH)

( * ) Notice: Subject to any disclaimer, the term of this patent is extended or adjusted under 35 U.S.C. 154(b) by 0 days.

(21) Appl. No.: 09/530,736
(22) PCT Filed: Nov. 6, 1998
(86) PCT No.: PCT/CH98/00477
§ 371 (c)(1),
(2), (4) Date: May 5, 2000
(87) PCT Pub. No.: WO99/24160
PCT Pub. Date: May 20, 1999

(30) Foreign Application Priority Data

Nov. 8, 1997 (CH) .................................................. 2577

(51) Int. Cl.[7] .................................................. B01L 9/06
(52) U.S. Cl. .......................... 422/104; 422/99; 422/102
(58) Field of Search .................................. 422/104, 102, 422/99; 366/57, 77, 80, 53, 92, 93, 96, 110, 111, 113, 114, 147, 149, 209, 218, 220, 225, 228, 229, 230, 341, 342; 165/104.19, 109.1; 236/93 R

(56) References Cited

U.S. PATENT DOCUMENTS 5,503,805 A    4/1996   Sugarman et al.
5,716,584 A *  2/1998   Baker et al. ................. 422/131
5,762,881 A *  6/1998   Harness et al. ............. 422/132

FOREIGN PATENT DOCUMENTS

| DE | 3220879 A  | * 12/1983 | |
| DE | 3220879 A1 | * 12/1983 | ............ B01L/9/06 |
| DE | 4214866    | 7/1993    | |
| FR | 2372740    | 6/1978    | |
| FR | 2453405    | 10/1980   | |
| WO | 9324233    | 12/1993   | |
| WO | 9709353    | 3/1997    | |

OTHER PUBLICATIONS

Derwent Abstract 1983–839516 of DE 3220879 A.*
Japanese Patent Abstract Publication JP 05 059374.

* cited by examiner

Primary Examiner—Jill Warden
Assistant Examiner—Elizabeth Quan
(74) Attorney, Agent, or Firm—Selitto, Behr & Kim

(57) ABSTRACT

An apparatus for providing temperature control and agitation to a plurality of reaction vessels comprises a plurality of elastic receptacles on a block, each receptacle supporting a reaction vessel below its neck, and, a plurality of elastic couplings, each coupling retaining a reaction vessel at its neck section. A flow channel is provided within the block to transfer a liquid temperature control medium to the reaction vessels. The flow channel is routed to each receptacle individually, thereby supplying the medium directly to the corresponding reaction vessel. A shaking arrangement is provided to agitate the reaction vessels by moving the receptacles horizontally relative to the couplings. The greatest deflection of each reaction vessel occurs at its base, while the neck sections are subjected to slight movement.

16 Claims, 3 Drawing Sheets

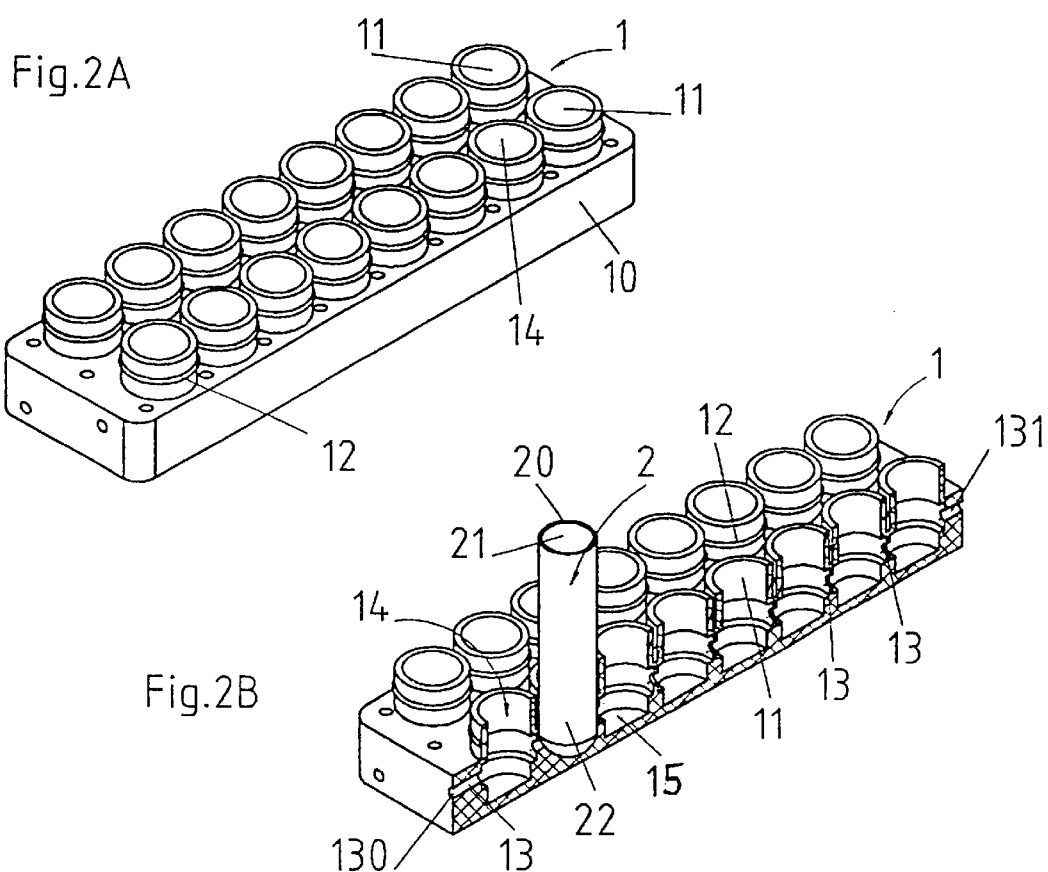
Fig.2A
Fig.2B
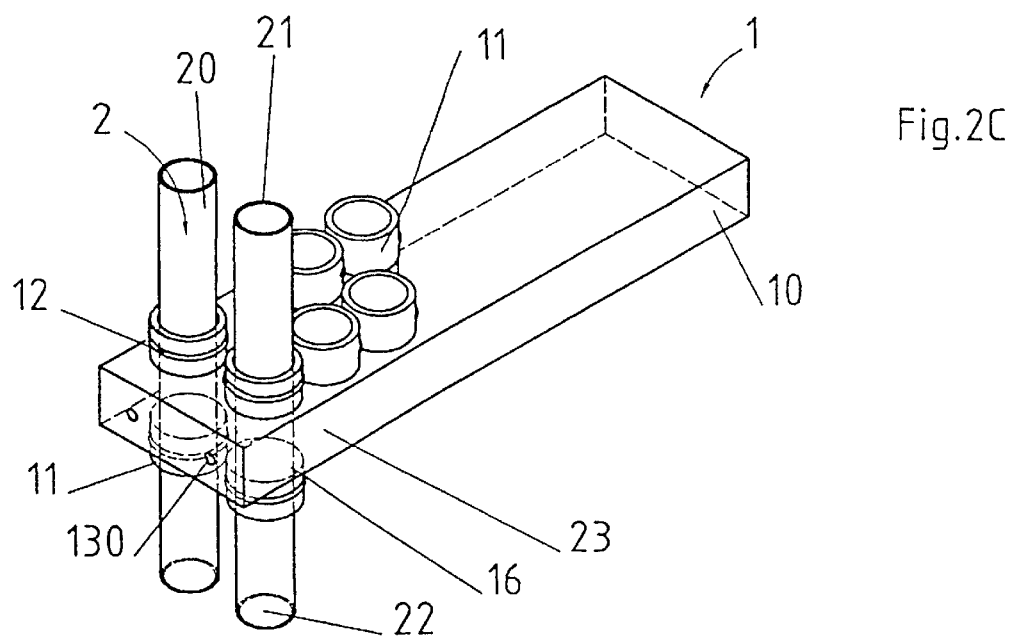
Fig.2C

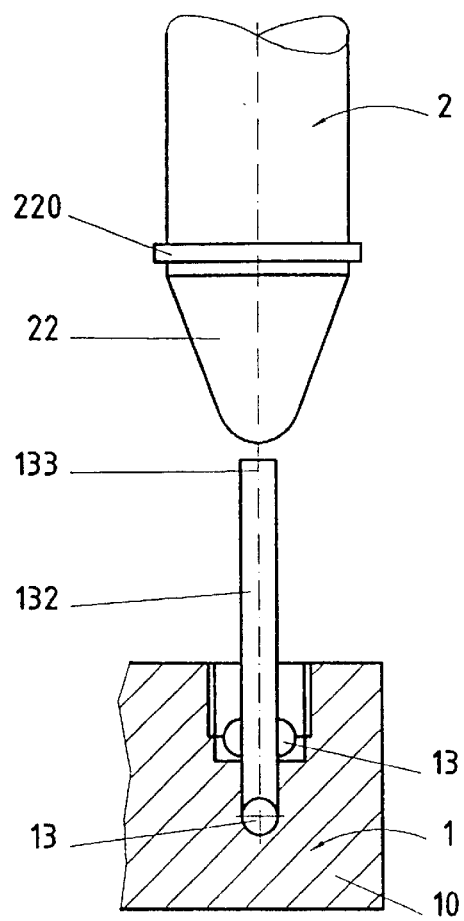
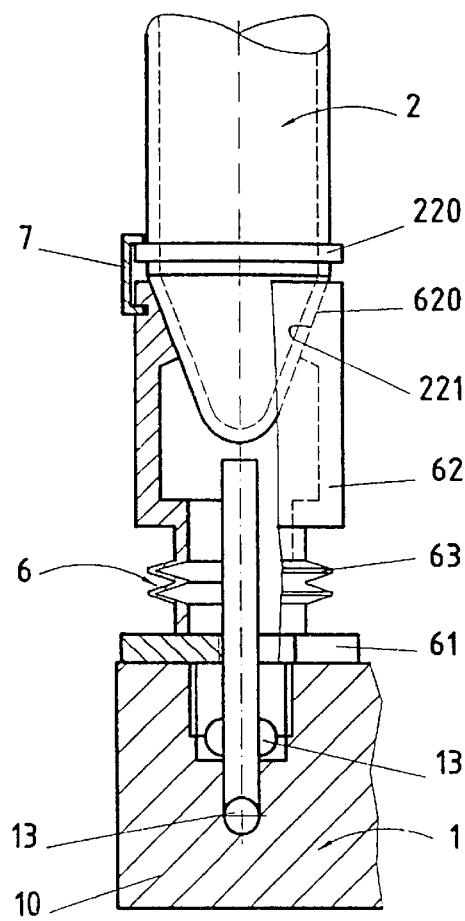
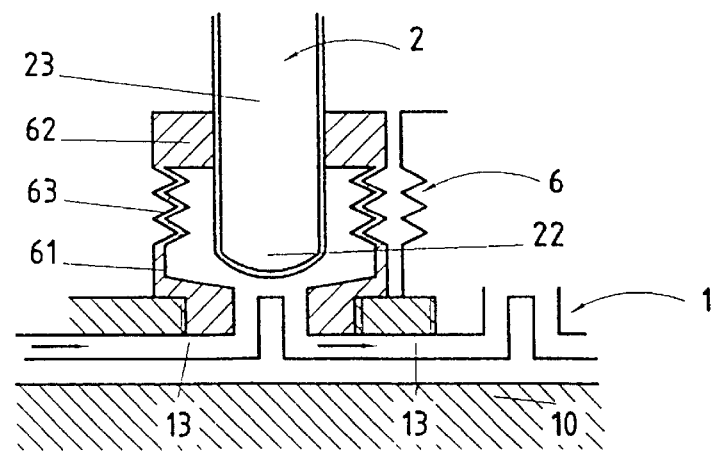

DEVICE FOR HOLDING REACTION VESSELS WHICH CAN BE THERMALLY ADJUSTED AND AGITATED

BACKGROUND OF THE INVENTION

1. Field of the invention

The present invention relates to an apparatus which can be used in research and has a reaction vessel, preferably a multiplicity of reaction vessels combined in a block, for carrying out chemical, biochemical or physical experiments in parallel and/or in series. In many experiments, it is necessary for the reaction vessel to be temperature-controlled, e.g. in the range between −70° C. and +200° C., with a simultaneous shaking movement and simultaneous metering into a closed reaction vessel. The equipment thus has to meet particular requirements.

2. Prior art

For example in chemical research in the pharmaceutical industry or in university research, it is increasingly important to discover, and then to test, a large number of potential active ingredients or combinations as quickly as possible. Some of the chemical research thus currently deals with combinatorial chemistry, parallel synthesis and high-speed chemistry. Of prime importance here is the possibility of being able to make wide use of known or novel chemical reaction types in parallel with minimal adaptation.

Various apparatuses with reaction vessels which are arranged in parallel, can be temperature-controlled and are intended for carrying out a multiplicity of experiments in parallel have thus been provided. In the simplest of these, use was made of open oil baths in which a block of the reaction vessels is fitted such that it can be shaken. The gravest disadvantage of such constructions is the narrowly restricted temperature range as a result of the open temperature-controlled bath in relation to a closed circuit. A further essential disadvantage is that it is not possible, during the shaking movement, to meter, for example, the solution of a reagent into the closed reaction vessels using an addition apparatus, e.g. a needle. Further temperature-controllable apparatuses provided are merely suitable for specific applications, for the most part of complicated construction, excessively large, not particularly user-friendly or barely allow any automation of individual process steps.

DE-A-32 20 879 discloses an apparatus for retaining reaction vessels which can be temperature-controlled and shaken by means of a shaking arrangement. The reaction vessels are retained in each case by means of an elastic coupling at the top and are mounted in recesses of elastic rests at the bottom. For the temperature control of the reaction vessels, there is arranged above the elastic rests, as a resistance heating means, a receiving body with through-passage bores through which the bottom ends of the reaction vessels project. The temperature control of reaction vessels via the resistance heating means and air located therebetween is still capable of improvement in terms of efficiency.

DE-C42 14 866 discloses a further apparatus for retaining test tubes which can be temperature controlled and shaken by means of a vibrating plate. Connected to the vibrating plate is a sample holder which, on its top side, is provided with pads which are made of elastic material and in which the bottom ends of the test tubes engage. A heating plate through which air can flow is arranged between the vibrating plate and sample carrier. In order that the hot air for heating the test tubes does not escape outward, said test tubes have to be enclosed by a casing.

Bohdan Europe, France, have brought an improved apparatus onto the market under the designation RAM Synthesizer BHD 1524. This apparatus comprises a heat-conducting temperature-control block with a multiplicity of depressions. A central inlet is provided in order to supply the temperature-control block with a liquid heat-transfer medium. The reaction vessels, which are screwed on a cavity plate and closed by septa, are introduced into the depressions, the top cavity plate with the screwed-on reaction vessels being rigidly fastened on the temperature-control block. The heating temperature control of the reaction vessels takes place in this case by energy being fed from the heat-transfer medium to the temperature-control block, in the direction of the shell of the reaction vessel. During cooling temperature control, the drop in temperature between the shell of the reaction vessel and the heat-transfer medium, via the heat-dissipating temperature-control block, causes a transfer of energy from the reaction vessel in the direction of the heat-transfer medium. The entire reaction block is positioned on a shaking arrangement and can thus be shaken and temperature-controlled at the same time.

The disadvantage with the RAM Synthesizer BHD 1524 apparatus is that during the shaking operation—with possible temperature control at the same time—the individual reaction vessel cannot be penetrated by a needle-like sampler, which is typically guided by a robot arm, in order for substances to be added or removed. However, it is precisely during the addition of substances that the operation of shaking the reaction vessel is often essential. The reaction vessel must necessarily be closed by a septum, with the result that a sampler introduced into the reaction vessel would have to be moved adequately at the frequency and amplitude of the shaking movement of the reaction vessel. With a, for example, conventional deflection of the reaction vessel of 10 mm with a rotation of 1000 revolutions/minute, the operation of moving the sampler along synchronously is ruled out in practice and is extremely disadvantageous (centrifugal forces). The above described apparatus, however, also has other disadvantages. During the shaking operation, it is necessary for the reaction block to be moved as a whole, which requires very stable equipment (vibration) and a powerful drive. For the temperature transfer from the liquid heat-transfer medium and the wall of the reaction vessel, the temperature-control block is interposed as a delaying and energy-absorbing component. Even in the case of very precise depressions and, at the same time, very precise reactors, a layer of air which, although minimal, has a pronounced insulating effect is produced between the temperature-control block and reactor.

OBJECT OF THE INVENTION

In view of the disadvantages presented, the object of the invention is to provide an apparatus where an individual reaction vessel and/or a block of reaction vessels are temperature-controlled as far as possible without any delay and with low losses. During the temperature control, it has to be possible for the reaction vessels to be shaken at the required intensity, in which case the substance surrounding the reaction vessels is to be moved as little as possible. Finally, it has to be possible, at the same time as the temperature-control and shaking operations, to use a sampler to meter substances into the reaction vessels, which may possibly be closed by a septum, or to take samples from the reaction vessels.

SUMMARY OF THE INVENTION

The essential features of the invention may be summarized as follows:

The apparatus for retaining a reaction vessel which can be temperature-controlled and shaken is preferably designed as a block with a multiplicity of combined reaction vessels. A flow channel for supplying a liquid temperature-control medium is routed up to reaction vessels and the apparatus has a shaking arrangement for moving the reaction vessels. The reaction vessels are retained in each case by means of an elastic coupling at the top of their neck sections and are supported in a sealed manner in elastic receptacles beneath their neck sections such that it is not possible for any liquid temperature-control medium supplied via the flow channel to escape. The shaking arrangement preferably acts on the elastic means which provide a supporting function beneath the reaction vessels.

The elastic coupling has a basically sleeve-like configuration with an axial through-passage. Its top end may be provided with an external thread for fastening on a carrier. The bottom end of the coupling advantageously has a fixing region and, right at the bottom, a standard ground joint. A folding bellows is located between the top and the bottom ends. The bottom end is inserted at least in part, preferably by way of the standard ground joint, into the inlet opening of the neck section of the reaction vessel. A number of embodiments have been developed for the elastic receptacles for providing bottom support for the reaction vessels.

First Embodiment

The elastic receptacles supporting the reaction vessels beneath their neck sections is formed by a block with a multiplicity of cylindrical, elastic walls which extend upward from the top side of said block. These walls constitute receiving stubs which each have an insertion opening which continues into the block as a hole. Each hole is intended for receiving the base section of a reaction vessel and each associated elastic wall is intended for engaging radially part of the way around said reaction vessel. The flow channel, for supplying the temperature-control medium, is routed to each hole, said temperature-control medium flowing out of the flow channel and around the respective reaction vessel.

Second Embodiment

The elastic receptacles means supporting the reaction vessels beneath their neck sections is formed by a block with a multiplicity of cylindrical, elastic walls which extend upward from the top side of said block and extend downward from the underside of said block. The walls on the top side and the underside constitute mutually aligned receiving stubs and each have a vertical through-passage in order to receive in each case the central section of a reaction vessel therein. The base sections of the reaction vessels project out of the bottom elastic walls, while the neck sections project out of the top elastic walls. Each elastic wall is intended for engaging radially part of the way around the inserted reaction vessel. The flow channel, for supplying the temperature-control medium, is routed to each vertical through-passage, said temperature-control medium flowing out of the flow channel and around the respective reaction vessel.

Both in the case of the first embodiment and in the case of the second embodiment, the flow channel begins at least one inlet on the block and ends at least one outlet. The flow channel continues from one hole to the adjacent hole or from one vertical through-passage to the adjacent vertical through-passage. The entire block advantageously consists of elastic material.

Third Embodiment

The elastic receptacles supporting the reaction vessels beneath their neck sections is formed by a block with a multiplicity of cylindrical, elastic couplings which extend upward from the top side of said block and receive at least the base section of the respective reaction vessel and engage radially around the same. The flow channel, for supplying the temperature-control medium, which flows around the respective reaction vessel, is routed into the interior of each coupling.

The elastic coupling has a basically sleeve-like configuration and an axial through-passage. A top socket element on the coupling has a sealing surface for engaging around the reaction vessel in a sealed manner, said reaction vessel having a sealing surface which is complementary. The coupling is terminated at the bottom by an attachment flange for fastening on the top side of the block. A folding bellows is located between the top socket element and the bottom attachment flange. In order to secure the retained reaction vessel and to produce a contact pressure between the sealing surfaces located one upon the other, a collar is provided on the reaction vessel, from which a clamp engages over to the socket element.

The flow channel, for supplying the temperature-control medium, emerges directly in the region of the elastic coupling fastened on the top side and continues, as a discharging flow channel, into the interior of the adjacent coupling. In the adjacent coupling, the discharging flow channel coming from the previous coupling fulfills a supply function.

Fourth Embodiment

This embodiment is similar to the third embodiment, but a flow tube which projects into the interior of the coupling and is intended for supplying the temperature-control medium is connected to the flow channel in the block. The temperature-control medium is discharged via an outgoing flow channel which opens out in the region of the elastic coupling fastened on the top side.

The invention, now, makes available a perfected apparatus which makes it possible for the reaction vessels retained therein to be temperature-controlled and shaken at the same time and, during these operations, for the reaction vessels to be penetrated by a removal and/or addition element for sample-taking or metering-in purposes. The removal and/or addition element may be guided by a robot. By virtue of the circulation of the temperature-control medium in a closed circuit, the reaction vessels can be temperature-controlled over a large temperature range, to be precise each reaction vessel in parallel or all reaction vessels in series.

BRIEF DESCRIPTION OF THE DRAWINGS

In the drawings:

FIG. 2A shows a perspective view of the block from FIG. 1A as a flexible chamber with the temperature-control arrangement and two rows of receiving stubs for the insertion of reaction vessels by way of their base section, in a first embodiment;

FIG. 2B shows the flexible chamber according to FIG. 2A with an inserted reaction vessel in a vertical section;

FIG. 2C shows a perspective view of the flexible chamber for the insertion of reaction vessels by way of their central section, in a second embodiment;

FIG. 3A shows a basic illustration of a detail of a block with a reaction vessel and the flow tube, for feeding the temperature-control medium, in a third embodiment;

FIG. 3B shows the illustration according to FIG. 3A with a flexible coupling adjoining the base section of the reaction vessel; and FIG. 3C shows a basic illustration of a detail of a block with a reaction vessel, a flexible coupling adjoining the base section of the reaction vessel, and temperature-control channels for feeding the temperature-control medium, in a fourth embodiment.

DETAILED DESCRIPTION OF THE INVENTION

Figure 1A:
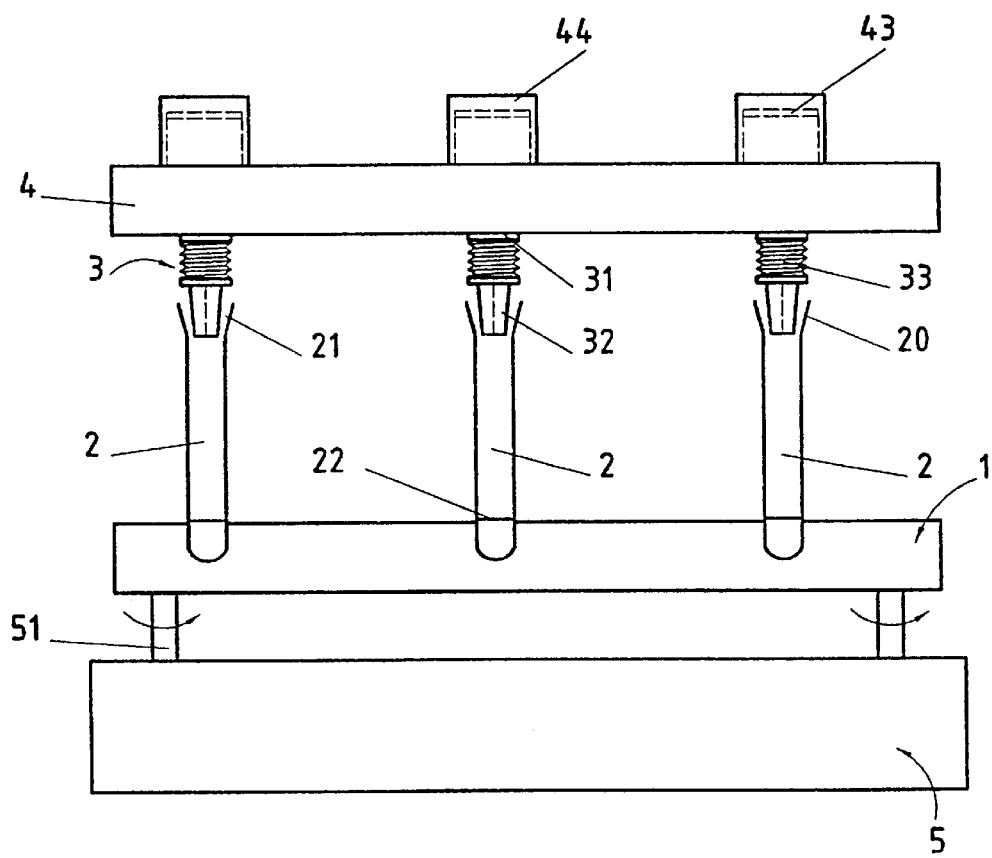
FIG. 1A shows a schematic illustration of an apparatus according to the invention with a block, provided with three reaction vessels of which the neck sections hang on flexible couplings and the base sections are enclosed by a temperature-control arrangement, and with a shaking arrangement.

The detailed description of exemplary embodiments of the apparatus according to the invention are given hereinbelow with reference to the attached drawings.

The following applies to the rest of the description: if, in order to avoid ambiguity in the drawings, a figure contains designations which are not explained in the directly associated text of a description, then you are referred to a point at which they are mentioned in prior or subsequent figure descriptions. For reasons of clarity, components are not usually designated again in subsequent figures, provided that it is clear from the drawings that they are "recurring" components.

FIG. 1A

Flexible couplings 3 are arranged beneath a rigid carrier 4 by way of their top, carrier end 31, said couplings extending vertically and being fastened, and opening out, in the neck section 20 of the reaction vessels 2 by way of their reaction-vessel end 32. The reaction vessels 2 may be sealed on the carrier 4 by in each case one septum 43, which is fixed in each case by a screw cap 44 made of plastic. Between the ends 31, 32, a coupling 3 has a folding bellows 33. The flexible coupling 3 allow the reaction vessels 2 to be shaken at high frequency, the inlet opening 21 of a reaction vessel 2 essentially maintaining its position, while the base section 22 of the reaction vessel 2 undergoes the main deflection. The base sections 22 are inserted flexibly in a block 1 which is connected to a shaking arrangement 5 via carry-along elements 51, shaking movements taking place in the arrow direction. The reaction vessel 2 is subjected to something of a conical movement.

The block 1 contains a temperature-control arrangement, which is not illustrated here. The reaction vessels 2 are shaken with the temperature-control arrangement without the shaking movement being transmitted to the rigid carrier 4. By virtue of the flexibility of the couplings 3 in the axial direction as well, it would also be possible to shake reaction vessels 2 connected rigidly to one another. A further advantage is that the shaking arrangement 5 is not subjected to the loading of the entire weight of the reaction vessels 2 including contents, as a result of which it is sufficient to have shaking arrangements 5 with relatively small dimensions, which produce comparatively weak vibrations. It is only this which makes it possible to use vibration-sensitive peripherals, e.g. samplers, robots or other automated arrangements for feeding and removing gases, liquids or solids. An essential advantage of the apparatus according to the invention is thus that, even during the shaking operation, liquid, gas or solid can easily be added to and/or removed from the reaction vessel 2, through the rigid carrier 4 and the coupling 3, using a feed and/or removal tool, e.g. a hollow needle, a gripper or a spoon. This has only been possible to a very limited extent, if at all, with the apparatuses known hitherto.

Figure 1B:
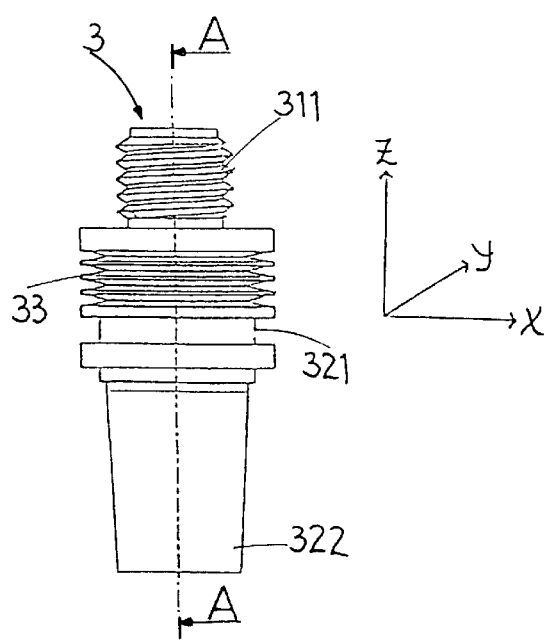
FIG. 1B shows a front view of the flexible coupling from FIG. 1A.
Figure 1C:
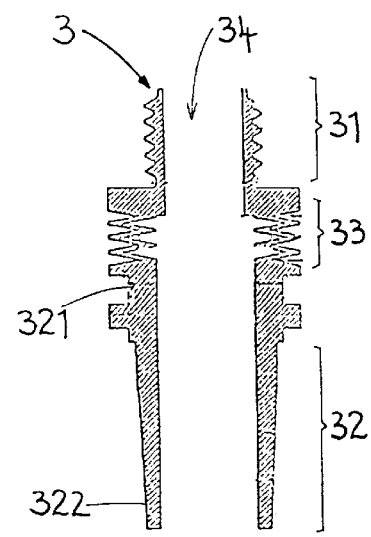
FIG. 1C shows the flexible coupling according to FIG. 1B in section along line A—A.

FIGS. 1B and 1C

The flexible, basically sleeve-like coupling 3 comprises the carrier end 31 and the reaction-vessel end 32, between which a folding bellows 33 is arranged. The folding bellows 33 provides the ability for the reaction-vessel end 32 to move in relation to the carrier end 31 in the x-, y- and z-directions. The carrier end 31 has a thread 311, with the result that the coupling 3 can be screwed into an internally threaded hole in the carrier 4. The reaction-vessel end 32 may possibly comprise a fixing region 321, for the provision of fastening fronts, and a standard ground joint 322 for the sealing, releasable insertion into the neck section 20 of a reaction vessel 2. A central through-passage 34 extends axially through the coupling 3 for the through-passage with an instrument, e.g. a sampler.

The coupling may consist, for example, of plastic or a metal, in particular of Teflon, polypropylene, EPDM/PP (ethylene-propylene-diene rubber) or thin sheet steel. As an alternative to the folding bellows 33, it is possible to use, for example a flexible tube, a bowl-end-socket joint or a joint with two or more axes.

FIGS. 2A and 2B

In a first exemplary embodiment, the elastic receptacles comprise block 1 which is formed as a flexible chamber from a material which is as flexible as possible and stable in a large temperature range—e.g. silicone, thin-walled Teflon, polypropylene or EPDM/PP. The block 1 comprises a base plate 10 from which a multiplicity of stub-cylindrical walls 11 extend vertically upward. The cylindrical walls 11 each enclose an insertion opening 14 which extends as a blind hole 15 into the base plate 10. Sealing rings 12 are provided radially in a strap-like manner on the circumference of the cylindrical walls 11. Passing through the chamber is a flow channel 13, which connects the blind holes 15 to one another. The insertion openings 14 and the blind holes 15 serve for receiving the base sections 22 of the reaction vessels 2, the sealing rings 12 enclosing, and thus securing, the reaction vessels 2. If the shaking arrangement 5 acts on the block 1, the material used need only be elastic to the degree where the inserted reaction vessels 2 are still carried along to a sufficient extent during the shaking operation. The flow channel 13 and the individual blind hole 15 are designed such that the temperature-control medium directed through the flow channel 13 flows around the base section 22 of an inserted reaction vessel 2.

A number of alternatives are available for the branching of the flow channel 13. In a straightforward refinement, the flow channel 13 extends from an inlet 130, connects all the blind holes 15 in series with one another and opens out at an outlet 131. In a parallel arrangement, the flow channel 13 runs from the inlet 130, as a joint supply line, directly to all the blind holes 15 and, from there, in discharge lines which open out into a joint discharge line and, finally, terminate at the outlet 131. In a further alternative, the flow channel 13 connecting all the blind holes 15 to one another has temperature-control medium running through it, while the temperature-control medium flows out through the sealing rings 12.

It is preferable for the entire block, but at least the cylindrical walls 11 and the surroundings thereof, to consist of elastic material. When the shaking arrangement 5 is switched on, the reaction vessels 2 are subjected to a shaking movement. The neck sections 20 of the reaction vessels 2 are connected to the elastic couplings 3 and barely execute any movements, while the base sections 22 execute a circulating movement and, in the process, are retained within the cylindrical, elastically compliant walls 11.

FIG. 2C

In a second exemplary embodiment, the flexible block 1 which is modified in so far as vertically extending cylindrical walls 11 are located not just on the top side of the base plate 10, but also on the underside, and the central sections 23 of the reaction vessels 2 are inserted in the block 1, while the neck sections 20 thereof project out of the block 1 at the top and the base sections 22 thereof project out of the block 1 at the bottom. A flow channel 13 extends through the block 1 in the same way, beginning at the inlet 130, with the result that temperature-control medium then flows around the central sections 23 of the reaction vessels 2. For the purpose of retaining in the secured manner a reaction vessel 2 which is enclosed by the walls 11 on both sides and is inserted in the vertical through-passage 16 of the block 1, all the walls 11 are enclosed by sealing rings 12.

FIGS. 3A and 3B

The third embodiment of the apparatus, once again, the elastic receptacles comprises a block 1 which does not have to be elastic and, in principle, merely comprises the base plate 10. Flow channels 13 for the feed and return of the temperature-control medium pass through the base plate 10. Flow tubes 132 projecting more or less as an extension out of the top of the block 1 run from the feeding flow channel 13. Above the outlet 133 of the flow tube 132, the reaction vessel 2 is arranged to hang on a coupling 3, with the result that the base section 22 is directed toward the outlet 133. A radially peripheral collar 220 is firmly arranged on the base section 22.

A sleeve-like, flexible coupling 6 is provided for the purpose of spanning between the base section 22 of the reaction vessel 2 and the top side of the block 1. The coupling 6 has, right at the bottom, an attachment flange 61, a folding bellows 63 thereabove and, right at the top, a socket element 62 with an internal circular sealing surface 620. In the installed state, the coupling 6 has been fitted over the flow tube 132 and the attachment flange 61 has been fastened on the top side of the block 1. The base section 22 has been inserted into the socket element 62, the sealing surface 620 of socket element 62 forming a sealed form-fitting connection with a complementary sealing surface 221 provided on the base section 22. A clamp 7 which engages over from the socket element 62 to the collar 220 is provided for the purpose of retaining the reaction vessel 2 securely and of producing a contact pressure between the sealing surfaces 221, 620.

When the shaking arrangement 5 is switched on, the movements are transmitted from the block 1, via the flexible couplings 6, to the reaction vessels 2. In this case, the coupling 6 is advantageously flexible in the x-, y- and z-direction. Provided the folding bellows 33 of the top coupling 3 already provide the necessary z-axis flexibility for the apparatus, the bottom coupling 6 need only be flexible in x- and y-directions, i.e. it would then be possible to dispense with the z-axis flexibility for the folding bellows 63.

Temperature-control medium supplied via the flow channel 13 sprays out of the outlet 133 of the flow tube 132 against the base section 22 of the reaction vessel 2 positioned thereabove and flows out again via a flow channel 13 which opens out within the attachment flange 61. In this embodiment too, the neck section 20 with the inlet opening 21 of the reaction vessel 2 barely executes any movement, with the result that access—as has been described above—is made possible.

FIG. 3C

In the fourth embodiment, rather than any flow tube 132 being required, mutually adjacent flow channels 13 for inflow and outflow emerge on the surface of the block 1, which, in turn, need not itself be elastic. The flow channel 13 for the outflow is, at the same time, the flow channel 13 for the inflow of the following reaction vessel 2. The flexible coupling 6 is fastened on the surface of the block 1 by way of its attachment flange 61, enclosing the outlets of the flow channels 13 for inflow and outflow in the process. The folding bellows 63 is located between the bottom attachment flange 61 and the top socket element 62, the reaction vessel 2 then having been pushed more deeply into the interior of the coupling 6 by way of the base section 22 and the central section 23. The sealing between the socket element 62 and the reaction vessel 2 is brought about by means of sealing surfaces and possibly additional clamping elements. A temperature-control medium flowing in via the flow channel 13 thus flows around the inserted reaction vessel 2 and is cast onto the adjacent reaction vessel 2 via the continuing flow channel 13.

What is claimed is:

1. An apparatus for retaining a plurality of reaction vessels (2) which can be temperature-controlled and shaken, each of said reaction vessel (2) having a neck section (20) and a base section (22), said apparatus comprising a plurality of elastic receptacles (1, 10, 11, 6), each of said receptacles supporting a corresponding reaction vessel (2) beneath its neck section (20) in a liquid-tight manner;

a flow channel (13), which is connected to said receptacles (1, 10, 11, 6) for flowing a liquid temperature-control medium around the corresponding reaction vessels (2);

a plurality of first elastic couplings (3), each of said first couplings retaining a corresponding reaction vessel at a top end of its neck section (20); and a shaking arrangement (5) for moving the reaction vessels (2) such that said receptacles (1, 10, 11, 6) move horizontally relative to said plurality of first couplings (3).

2. The apparatus as claimed in claim 1, wherein the shaking arrangement (5) acts on the elastic receptacles (1, 10, 11, 6).

3. The apparatus as claimed in claim 2, wherein each of said first elastic couplings (3) has an axial through-passage (34); a top end (31), which is provided with an external thread (311); a bottom end (32), which has a fixing region (321) and a standard ground joint (322) at the bottom thereof; and a folding bellows (33) located between the top end (31) and bottom end (32); wherein the top end (31) is fixed on a carrier (4); and at least part of the bottom end (32) is inserted into the inlet opening (21) of the neck section (20) of the reaction vessel (2).

4. The apparatus as claimed in claim 1, wherein each of said first elastic couplings (3) has an axial through-passage (34);

a top end (31), which is provided with an external thread (311);

a bottom end (32), which has a fixing region (321) and a standard ground joint (322) at the bottom thereof; and a folding bellows (33) located between the top end (31) and the bottom end (32), the top end (31) being fixed on a carrier (4), and at least part of the bottom end (32) being inserted into the inlet opening (21) of the neck section (20) of the reaction vessel (2) by means of the standard ground joint (322).

5. The apparatus as claimed in one of the claims 1–4 comprising a block (1), wherein the plurality of elastic receptacles comprise a plurality of cylindrical, elastic walls (11) which extend upward from a top side of said block (1), each of said receptacles having a vertical through-passage extending into the block and having a blind hole (15) within the block and an insertion opening (14) opposite said blind hole, each of said receptacles receiving the base section (22) of a corresponding reaction vessel (2) through said insertion opening (14) and each corresponding elastic wall (11) radially engaging at least part of a circumference of the corresponding reaction vessel (2); and the flow channel (13) intersects each receptacle near it blind hole (15), whereby said temperature-control medium flows out of the flow channel (13) and around the base section (22) of the corresponding reaction vessel (2).

6. The apparatus as claimed in claim 5, wherein the block (1) has at least one inlet (130) and at least one outlet (131);

the flow channel (13) begins at said at least one inlet (130) and ends at said at least one outlet (131);

the flow channel (13) hydraulically connects each of said blind holes to at least one adjacent blind hole; and the block (1) consists of elastic material.

7. The apparatus as claimed in claim 5, wherein the block (1) has at least one inlet (130) and at least one outlet (131);

the flow channel (13) begins at said at least one inlet (130) and ends at said at least one outlet (131);

the flow channel (13) hydraulically connects each, said vertical through-passage (16) to at least one adjacent vertical through-passages (16); and the block (1) consists of elastic material.

8. The apparatus as claimed in one of claims 1–4 comprising a block (1), wherein the plurality of elastic receptacles comprise a plurality of first cylindrical, elastic walls (11) which extend upward from a top side of said block (1) and a plurality of second cylindrical, elastic walls which extend downward from a bottom side of said block, each of said receptacles comprising a first cylindrical wall aligned with a second cylindrical wall, and vertical through-passage (16), part of which is defined by said first and second cylindrical walls, penetrating said block (1), wherein each of said receptacles receives a central section (23) of a corresponding reaction vessel (2) therein such that the base section (22) of said corresponding reaction vessel (2) extends beyond the corresponding second cylindrical wall (11) and the neck section (20) extends beyond the corresponding first cylindrical wall (11);

each of said first cylindrical walls and each of said second cylindrical walls radially engaging at least part of a circumference of the corresponding reaction vessel (2); and the flow channel (13) is connected to each vertical through-passage (16) of each of said receptacles, whereby said temperature-control medium flows out of the flow channel (13) and around the central section (23) of the corresponding reaction vessel (2).

9. The apparatus as claimed in claim 8, wherein the block (1) has at least one inlet (130) and at least one outlet (131);

the flow channel (13) begins at said at least one inlet (130) and ends at said at least one outlet (131);

the flow channel (13) hydraulically connects vertical through-passage (16) to at least one adjacent vertical through-passage (16); and the block (1) consists of elastic material.

10. The apparatus as claimed in one of claims 1–4, said apparatus comprising a block (1), wherein the plurality of elastic receptacles comprise a plurality of second elastic couplings (6), each of said second couplings being a cylinder, said cylinder extending upward from a top side of said block and having an interior chamber, each of said second couplings receiving at least the base section (22) of a corresponding reaction vessel (2) and radially engaging a circumference thereof; and the flow channel (13) intersects the interior chamber of each of said second couplings (6) whereby said temperature-control medium flows around said at least the base section (22) of the corresponding reaction vessel (2).

11. The apparatus as claimed in claim 10, wherein each second coupling (6) comprises a vertical through-passage;

a socket element (62) at a top of each of said second couplings, said socket element (62) having a sealing surface (620) for engaging a sealing surface (221) of a reaction vessel (2), thereby forming a seal between said socket element and said reaction vessel, said sealing surface (620) of the socket element being complementary to the sealing surface (221) of the reaction vessel;

an attachment flange (61) at a bottom of each of said second couplings for fastening said each of said second couplings to a top side of the block (1); and a folding bellows (63) located between the socket element (62) and attachment flange (61).

12. The apparatus as claimed in claim 11, wherein the flow channel (13) hydraulically connects the interior chamber of said each second coupling (6) to the interior chamber of an adjacent second coupling (6), whereby the temperature-control medium discharges from the interior chamber of said each second coupling to the interior chamber of said adjacent second coupling.

13. The apparatus as claimed in claim 11, comprising a plurality of flow tubes, each of said flow tubes (132) projecting into the interior chamber of a corresponding second coupling (6) and being connected to the flow channel (13) to supply temperature-control medium into the interior chamber of said corresponding second coupling, said flow channel (13) intersecting said interior chamber such that said temperature-control medium is discharged from said interior chamber through said flow channel (13).

14. The apparatus as claimed in claim 11 comprising a plurality of collars (220), each of said collars affixed to a corresponding reaction vessel (2); and a plurality of clamps (7), each of said clamps engaging a corresponding socket element (62) and a corresponding collar (220) thereby producing contact pressure between the sealing surface (221) of said corresponding reaction vessel and the complementary sealing surface (620) of said corresponding socket element.

15. The apparatus as claimed in claim 10, wherein the flow channel (13) hydraulically connects the interior chamber of each of said second couplings (6) to the interior chamber of an adjacent second coupling (6), whereby the temperature-control medium discharges from the interior chamber of each of said second couplings to the interior chamber of said adjacent second coupling.

16. The apparatus as claimed in claim 10, comprising a plurality of flow tubes (132), each of said flow tubes (132) projecting into the interior chamber of a corresponding second coupling (6), and being connected to the flow channel (13) to supply temperature-control medium into the interior chamber of said corresponding second coupling, said flow channel (13) intersecting said interior chamber such that said temperature-control medium is discharged from said interior chamber through said flow channel (13).

* * * * *